United States Patent
Birkmann et al.

(10) Patent No.: US 9,137,123 B2
(45) Date of Patent: Sep. 15, 2015

(54) GAIN TO GAIN NETWORK FOR AIRCRAFT GALLEY SYSTEM

(71) Applicant: BE INTELLECTUAL PROPERTY, INC., Wellington, FL (US)

(72) Inventors: Timothy A. Birkmann, Long Beach, CA (US); William J. Godecker, Irvine, CA (US); Sebastien A. Ramus, Olathe, KS (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 14/527,535

(22) Filed: Oct. 29, 2014

(65) Prior Publication Data

US 2015/0067134 A1   Mar. 5, 2015

Related U.S. Application Data

(63) Continuation of application No. 13/071,416, filed on Mar. 24, 2011, now Pat. No. 8,880,685.

(60) Provisional application No. 61/318,103, filed on Mar. 26, 2010.

(51) Int. Cl.
| | |
|---|---|
| G06F 15/16 | (2006.01) |
| G08C 17/02 | (2006.01) |
| B64D 11/04 | (2006.01) |
| H04L 29/08 | (2006.01) |
| H04L 12/24 | (2006.01) |
| H04L 12/26 | (2006.01) |
| G05B 13/02 | (2006.01) |
| B63B 29/22 | (2006.01) |
| B64D 13/06 | (2006.01) |

(52) U.S. Cl.
CPC ............ H04L 41/24 (2013.01); B64D 11/04 (2013.01); G08C 17/02 (2013.01); H04L 43/10 (2013.01); H04L 67/12 (2013.01); *B63B 29/22* (2013.01); *B64D 2013/0629* (2013.01); *G05B 13/02* (2013.01)

(58) Field of Classification Search
CPC ......... H04L 41/24; H04L 43/10; H04L 67/12; G08C 17/02; B64D 11/04
See application file for complete search history.

(56) References Cited

U.S. PATENT DOCUMENTS

| | | | |
|---|---|---|---|
| 6,845,627 B1 * | 1/2005 | Buck | 62/185 |
| 8,289,670 B2 * | 10/2012 | Aronson et al. | 361/93.2 |
| 8,321,073 B2 | 11/2012 | McAvoy | |
| 8,358,609 B1 | 1/2013 | Cona et al. | |
| 8,880,685 B2 * | 11/2014 | Birkmann et al. | 709/224 |
| 2004/0067177 A1 * | 4/2004 | Thieman et al. | 422/177 |
| 2005/0043996 A1 | 2/2005 | Silver | |

(Continued)

OTHER PUBLICATIONS

China Search Report, Mar. 25, 2014, 2 pages.

*Primary Examiner* — Larry Donaghue
(74) *Attorney, Agent, or Firm* — Fulwider Patton LLP

(57) ABSTRACT

An aircraft galley system is configured with a GAIN to GAIN network that allows for data exchange and communication between each GAIN on the system. By omitting reliance on a galley network controller for acquisition of GAIN data, the present system is simpler, lighter, and more cost-effective. Each GAIN may be polled for data by any other GAIN, such as via a data port, dedicated bus, or wireless connection. The data acquisition between the GAIN and a data collection and display device may be wired in network, wired out of network, or through a wireless link such as a Wi-Fi network.

11 Claims, 3 Drawing Sheets

(56) References Cited

U.S. PATENT DOCUMENTS

| | | |
|---|---|---|
| 2005/0121978 A1 | 6/2005 | McAvoy |
| 2005/0267935 A1 | 12/2005 | Gandhi et al. |
| 2008/0141315 A1 | 6/2008 | Ogilvie |
| 2008/0196087 A1 | 8/2008 | Ranjit |
| 2008/0319806 A1 | 12/2008 | Abhyanker |
| 2009/0103221 A1 | 4/2009 | Aronson et al. |
| 2009/0112377 A1 | 4/2009 | Schalla et al. |
| 2010/0071384 A1 | 3/2010 | Lu et al. |
| 2010/0281892 A1 | 11/2010 | Schroder |
| 2012/0209906 A1 | 8/2012 | Ausfeld |
| 2013/0033789 A1 | 2/2013 | Aronson et al. |

* cited by examiner

GAIN TO GAIN NETWORK FOR AIRCRAFT GALLEY SYSTEM

CROSS-REFERENCES TO RELATED APPLICATIONS

This application is a continuation of U.S. application Ser. No. 13/071,416, filed Mar. 24, 2011, which claims priority from U.S. Provisional Application No. 61/318,103, filed Mar. 26, 2010 incorporated by reference in its entirety.

BACKGROUND

The present invention relates generally to the field of aircraft data transfer, and more particularly relates to an adaptive data transfer network for managing and sharing information, and this sharing can eliminate the need for a galley network controller.

Present day commercial aircraft are traditionally configured with a food and beverage preparation area, commonly referred to as a galley. The galley can contain refrigeration units, heaters, and appliances for the preparation of food and beverages, such as ovens, beverage brewing machines, etc. In addition to the devices described above, galley equipment includes such devices as beverage dispensers, ovens, brewers, trash compactors, beverage carts, and the like. All of the galley's power consuming equipment can run off a single power source that services the network of devices.

In a typical galley power distribution system, GAlley INserts, or "GAINs," are power clients that request power in specific time intervals from a galley network controller. In the configuration of FIG. 1, the information pertaining to each GAIN has to be transmitted first to the GNC. As a result, a GNC is a necessary element of the system that contributes weight and complexity to the power system as well as costs. In addition, the system of FIG. 1 does not allow for information to be accessed directly from the individual GAINs, but rather all information must be obtained via the GNC. For example, an aircraft mechanic cannot obtain information contained in a particular GAIN installed in the galley by directly interrogating either the GAIN in question or one of the other GAINs. Rather, the aircraft mechanic must interface with the GNC to investigate what is happening with the individual GAINs. The system's inflexibility increases the amount of time that an aircraft mechanic or other personnel requires to obtain information from the individual GAINs in addition to making the system heavier and more expensive.

SUMMARY OF THE INVENTION

In view of the foregoing, the present invention seeks to provide greater flexibility and cost savings in a system for a galley, where new equipment behavior may be introduced as part of an adaptive system. That is, each networked device can poll operational and functional characteristics of the other devices connected in the network, thereby eliminating the need for a galley network controller in the system. When additional devices are added or replaced in the system, there is no need to reconfigure a galley network controller since each device can automatically recognize and interrogate the new devices, making the system much more flexible and adaptive.

The network connectivity and interrogation of various galley GAINs (e.g., coffee makers, water heaters, espresso makers, ovens, chillers, refrigerators, trash compactors and other equipment and appliance used in an aircraft galley environment) make it possible for any network device to transfer useful information (digital data) to any other network device without routing through a central galley network controller. A network display device for displaying the requested device information may be a wired GAIN already in the system, a wired non-GAIN device that may perform specialized data collection and display, a non-GAIN device that may plug into the system but is not a permanent component of the system, or a wireless device that can connect and receive data wirelessly from a GAIN in the network.

An example of device data that may be collected and stored in a particular GAIN may be the maintenance and fault data for any device in the network. This information can be conveniently retrieved in the system of the present invention by connecting directly to a GAIN in the system, which can poll and store the information for all connected GAINs, and then display the information via a display device such as a laptop computer or a hand-held PDA or smartphone. Access to the galley digital network may be achieved from an access port on a GAIN (such as, for example, an included USB port), an access port on the digital network that connects the GAINs, or a wireless access point. Wireless access points are not limited to non-passive WiFi capability. In other words, data transfer can occur across passive infrared signals.

The invention uses networked self-aware and system-aware adaptive aircraft galley equipment that can access specialized data from all connected GAINs and transfer the information to any type of digital network access point. It should be noted that this invention could be used even if a GNC is present in the system. For example, a user (flight attendant, aircraft mechanic, etc.) could still access the information by connecting (physically or wirelessly) to one of the GAINs present in the system, without going through the GNC directly.

The introduction of a small galley network makes it possible for GAIN-to-GAIN information sharing that implements power control arbitration (consistent with ARINC 812 Decentralized Power Control). Other advantages include that a single network display device could be used to locally control and poll all galley equipment for selected information. That is, since the GAINs provide detailed status information and allow for remote control operation, a single, centralized point of control streamlines in-galley operations by having a time-dependent central point of catering control.

One advantage of this invention is that it provides for multiple options for data collection, status, control and analysis of GAIN-centric specialized data. For example, a wireless (or wired) hand-held device can readily offload data (catering-specific data, maintenance data, FDA-compliant data, etc) from the entire galley network (all GAINs) with the touch of a button, such as for example a smart phone application. In addition, data integrity of the network may be secured via various network authentication methods.

DETAILED DESCRIPTION OF THE PREFERRED EMBODIMENTS

Figure 1:
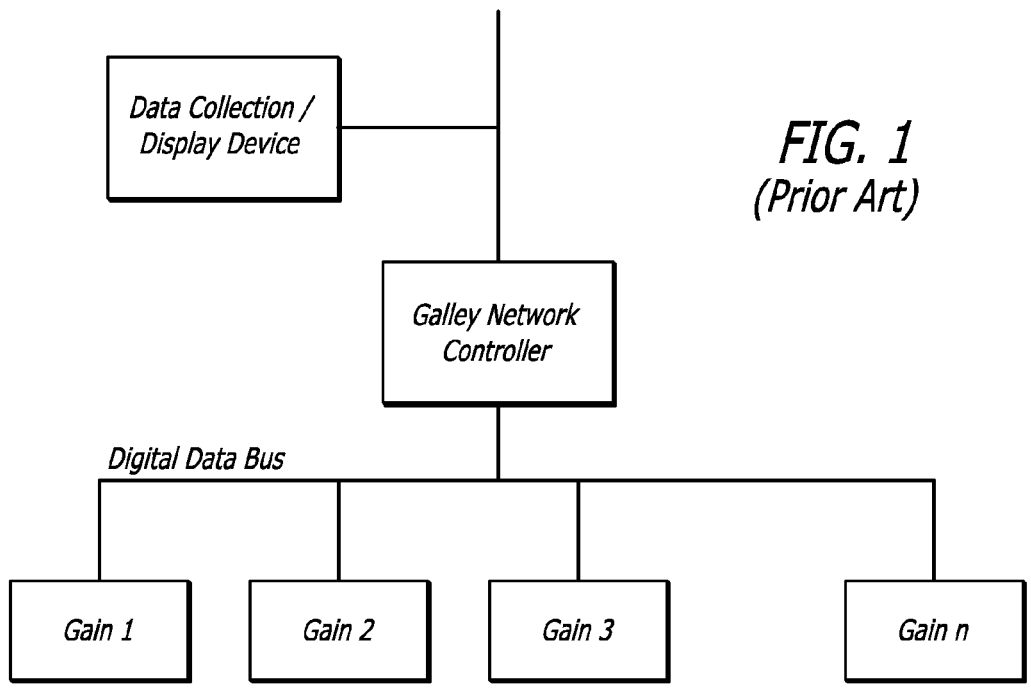
FIG. 1: A prior art galley network system architecture.
Figure 2:
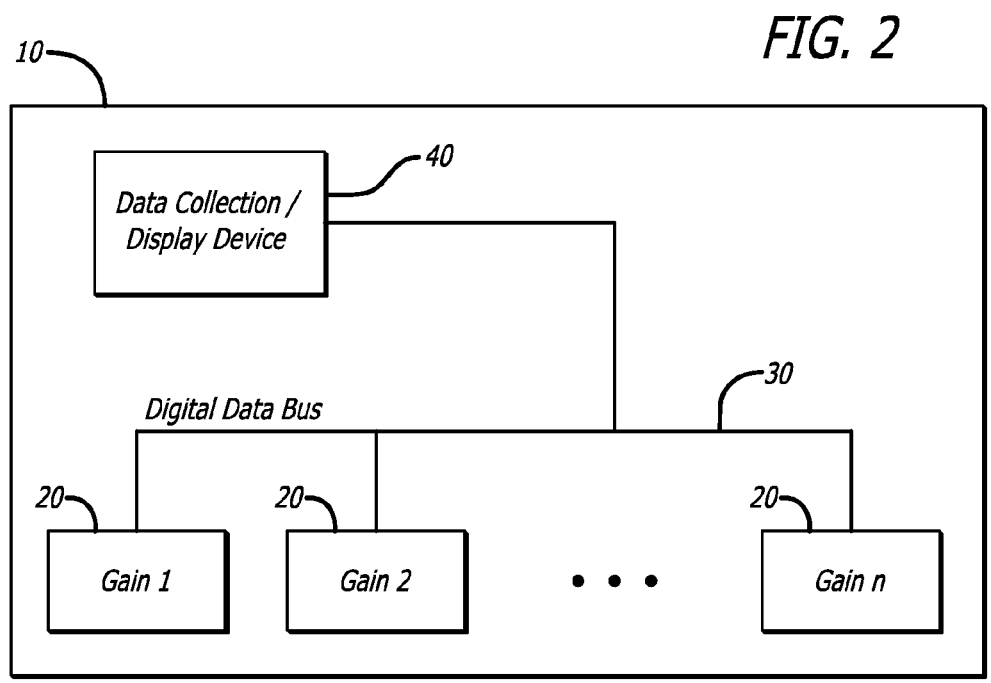
FIG. 2: A GAIN network with in-network wired data collector.

The present invention is an adaptive, GAIN-to-GAIN data distribution network for collecting galley equipment data from a component of the network without the need for a dedicated galley network controller. FIG. 2 illustrates a first type of system 10 encompassing the present invention, where a series of galley devices 20 are designated GAIN 1, GAIN 2, GAIN 3, . . . , GAIN n. The GAINs of the system are self-aware and system-aware equipment, in that the devices can not only recognize, store, poll, and communicate its own diagnostic and operational data, but also can recognize, store, poll, and communicate and receive data from other devices on the network.

The GAINs 20 may be kitchen equipment, such as coffee makers, trash compactors, auxiliary galley lighting, or they may be ovens, refrigerators, drink carts, or the like. The system includes a digital data bus 30 that connects each GAIN 20 to each other in parallel, and permits each GAIN 20 to communicate with each other GAIN in the system. The digital bus provides a conduit by which data can be exchanged throughout the system, and links each of the devices in the system to every other device. It should be noted that other types of connections are possible between the GAINs of the system, including logical connections and wireless connections (see, e.g., FIG. 4).

Also connected to the bus 30 is a display device 40 that collects data about the system and displays it on command. That is, the display device 40 can, for example, poll GAIN 1 and request or access certain information about GAIN 1, such as current power consumption, hours of operation, temperature, life cycles, status, or other diagnostic information that may be present in the device's memory. Similarly, the display device can request information from GAINs 2, 3, . . . n in a similar manner, and display the information on a designated display screen. However, the display device 40 can access GAIN 1 to interrogate or poll GAINs 2-n and obtain their data as well. In this embodiment, the display device 40 is hard-wired into the system 10 at the data bus 30. This has the advantage of ensuring that the display device 40 is adapted for the particular system and can be selected to meet the particular needs of the network. In one preferred embodiment, the display device 40 may be a component of one of the GAINs itself. For example, many galley devices already include a display, such as for example brewing equipment, ovens, and refrigerators. These displays can be used to transmit the requested service data of the device or other connected devices. Alternatively, the display device 40 can be a separate, dedicated display device 40 that is not part of any GAIN, but is a permanent member of the network.

Figure 3:
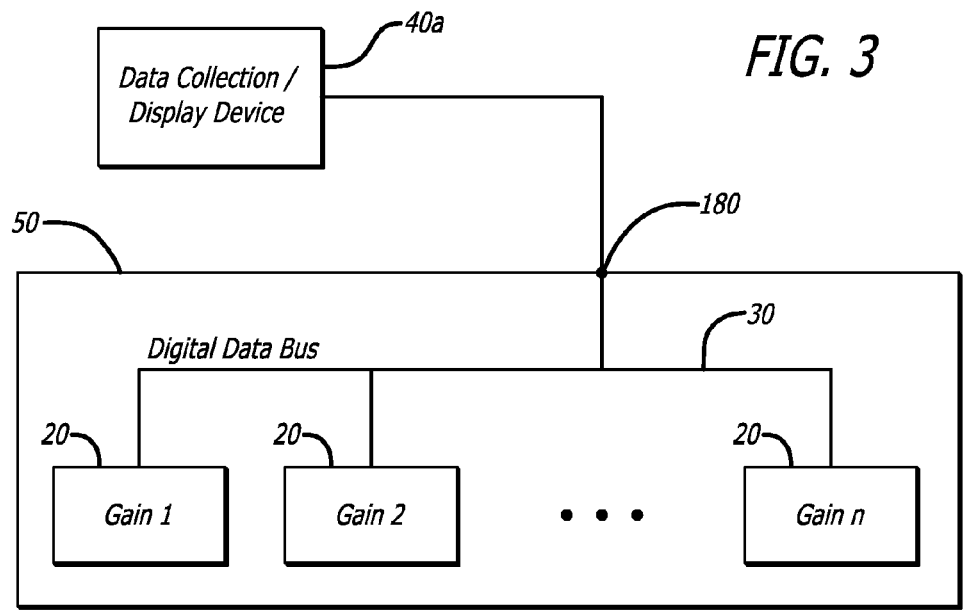
FIG. 3: A GAIN network with off-network wired data collector.

FIG. 3 discloses an alternate embodiment to the system of FIG. 2, where the data display device 40a is not hardwired into the system 50, but rather can connect to the system 50 at a data port 180 or other circuit entry point to read the system's information and display it to a user. The off-network display device 40a offers the benefit of multiple possible entry points, and can allow the system 50 to be smaller since the display device 40a can be stored elsewhere when not in use. This provides for a more compact configuration and can also provide flexibility as to the type of display device 40a used. For example, the system may offer the opportunity to be read by a laptop computer or a hand-held display device such as a PDA, smartphone, or the like. The display device 40a may plug into the system using a cable that connects to a data port 180, and uses a software program or application to tap into the network, and interrogate/retrieve the desired information from one or more of the GAINs 20. The use of a hand-held display device simplifies the system's maintenance and lower's its weight while reducing the overall costs of the system.

Figure 4:
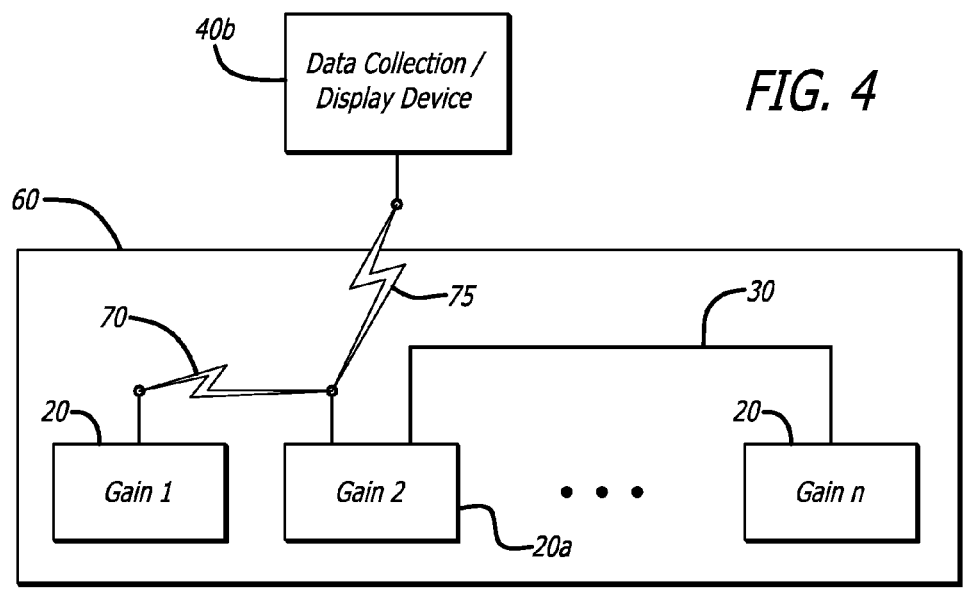
FIG. 4: A GAIN network with off-network wireless data collector.

FIG. 4 illustrates yet a third embodiment of the invention, where the display device 40b communicates with the network using a wireless link 75 across either a WiFi network, a bluetooth connection, a passive infrared coupling, or other type of wireless communication. In this case, the display device 40b links wirelessly to one of the GAINs 20a in the system 60, and extracts the desired information from the GAIN 20a in a wireless data exchange. The connected GAIN 20a can in turn retrieve and provide information from other GAINs 20 across the connected designated data bus 20. Alternatively, the GAINs 20a, 20 can be connected using a wireless connection 70, or a logical connection (not shown). The benefit of the wireless data acquisition is that a wired connection is not necessary, allowing a technician to retrieve the system's 60 information without physically connecting directly into the system. Where accessibility is problematic in tight quarters such as aircraft galleys, a wireless connection 75 can prove to be a very helpful feature to those who need to retrieve the information quickly without disassembling or rearranging the galley equipment.

Figure 5:
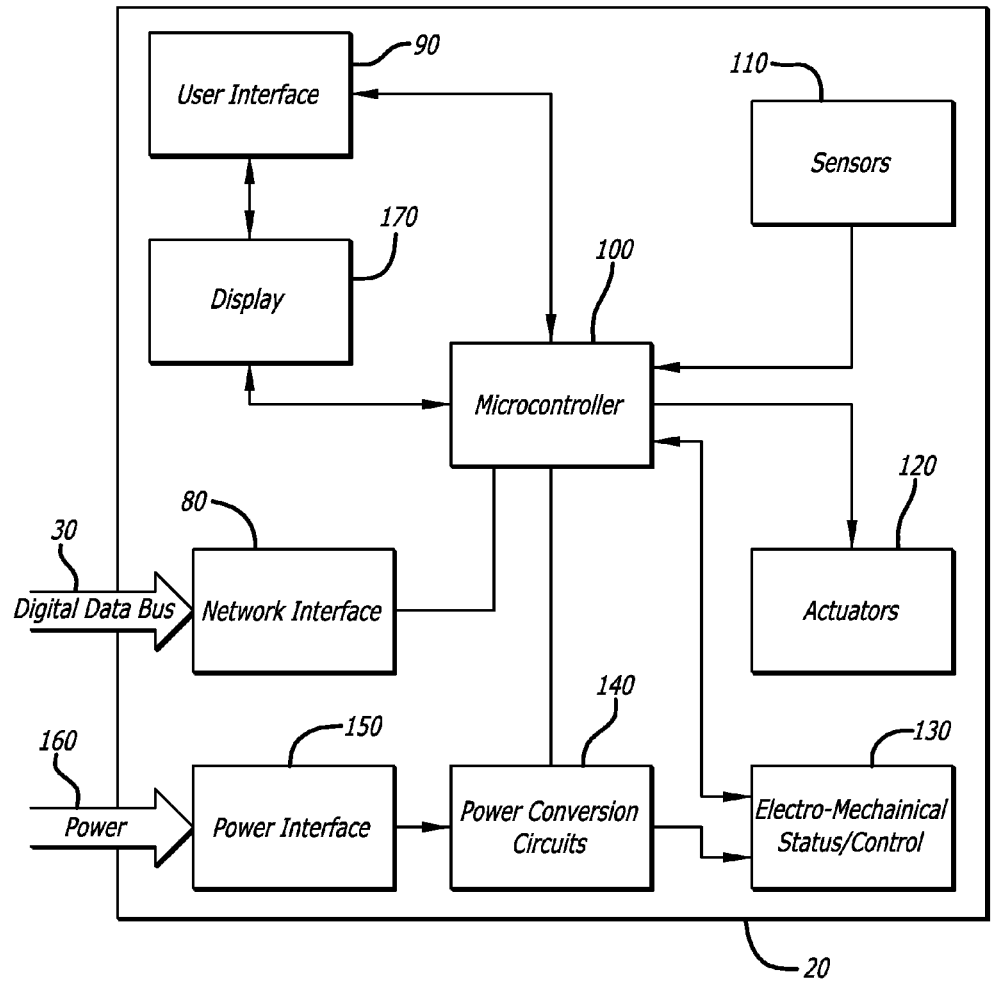
FIG. 5: A block diagram of a GAIN device used in the present invention.

FIG. 5 illustrates a GAIN 20 that may be used with the present invention, and can represent a chiller, an oven, or any device on the network. The GAIN 20 receives and sends information across the digital data bus 30, although data exchange as set forth above may take place across other types of connections, both physical and wireless. The data bus 30 connects to a network interface 80 that is part of the GAIN, where data is sent back and forth between a microcontroller 100 that manages the GAIN's operation. The network interface 80 can be a wired connection, an ethernet connection, a CAN connection, a wireless connection, or the like. The microcontroller 100 interfaces with sensors 110 that monitor the status of the GAIN, and can be current sensors, voltage sensors, temperature sensors, and other types of sensors depending upon the type of equipment.

The microcontroller 100 also communicates with actuators 120 that perform certain functions of the GAIN, such as a hydraulic actuator for a trash compactor, a solenoid, or a heating element for a beverage brewing apparatus. The microcontroller 100 can also manage and monitor the electro-mechanical status 130 of the GAIN to determine such characteristics as power usage, motor control, heating element control, and the like. Power 160 from a power feeder (not shown) is delivered to the GAIN at a power interface 150, and the power is converted to usable power by the GAIN at a power conversion circuit 140, which powers the microcontroller 100 as well as the electro-mechanical actuators 130.

A user interface 90 that is accessible from the GAIN's exterior surface can be a touch screen, keyboard, pointing device, LED indicators, buttons, or the like that may be used to enter and request information into/from the system. Finally, a screen 170 is connected to the GAIN at the user interface 90 and the microcontroller 100 for displaying information and/or data to the user. The data can be data for the GAIN shown, or the data can be from another GAIN that is polled by the microcontroller 100 across the bus 30 or other connection within the network. Thus, in this manner any GAIN's information can be displayed on display 170, even GAINs that are not wired physically to the network.

From the foregoing, it will be appreciated that specific embodiments of the invention have been described herein for purposes of illustration, but that various modifications may be made without deviating from the spirit and scope of the invention. For example, although the food storage and food processing units described above have been described in the context of aircraft usage, in other embodiments, food storage and food processing units that include aspects of the present invention can be used in other food storage and food processing contexts. Accordingly, the invention is not limited except as by the appended claims.

We claim:

1. An adaptive aircraft galley network, comprising:
   a plurality of galley powered inserts (hereafter "powered GAINS") comprising a network interface, a controller in communication with the network interface, a sensor monitoring a status of the powered GAIN, an actuator controlled by the controller, a user interface including a display, and a power interface with power conversion circuitry;
   a digital data bus connecting each powered GAIN in the network to each other powered GAIN in the network; and
   wherein the powered GAINs in the network read and display data of any powered GAIN in the network, and where the display of the other powered GAINS in the network does not rely on a galley network controller.

2. The adaptive aircraft galley network of claim 1, wherein the sensor is selected from a group comprising current, voltage, and temperature.

3. The adaptive aircraft galley network of claim 1, wherein the actuator is an electro-mechanical actuator.

4. The adaptive aircraft galley network of claim 1, wherein the display is operatively connected to a powered GAIN by connecting to a data port in the network via a cable.

5. The adaptive aircraft galley network of claim 1, wherein the display is operatively connected to a powered GAIN through a wireless data connection.

6. The adaptive aircraft galley network of claim 5, wherein the wireless connection between the display and a powered GAIN is a bluetooth connection.

7. The adaptive aircraft galley network of claim 5, wherein the wireless connection between the display and a powered GAIN is across a local WiFi network.

8. The adaptive aircraft galley network of claim 5, wherein the wireless connection between the display and a powered GAIN uses passive infrared signals.

9. The adaptive aircraft galley network of claim 1, wherein the display is a hand-held unit.

10. The adaptive aircraft galley network of claim 1, wherein data specific to a powered GAIN's operation pertains to a group comprising maintenance and fault data.

11. The adaptive aircraft galley network of claim 1, wherein each powered GAIN recognizes all other powered GAINs connected in the network.

\* \* \* \* \*